(12) United States Patent  (10) Patent No.: US 9,201,170 B2
Kumai  (45) Date of Patent: Dec. 1, 2015

(54) METHOD FOR PRODUCING POLARIZING ELEMENT

(71) Applicant: SEIKO EPSON CORPORATION, Tokyo (JP)

(72) Inventor: Yoshitomo Kumai, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 325 days.

(21) Appl. No.: 13/774,588

(22) Filed: Feb. 22, 2013

(65) Prior Publication Data

US 2013/0227992 A1  Sep. 5, 2013

(30) Foreign Application Priority Data

Mar. 5, 2012 (JP) ................. 2012-048257

(51) Int. Cl.
  C03B 23/037 (2006.01)
  C03C 17/00 (2006.01)
  C03C 17/34 (2006.01)
  G02B 1/10 (2015.01)
  G02B 5/30 (2006.01)

(52) U.S. Cl.
  CPC ............... *G02B 1/10* (2013.01); *C03B 23/037* (2013.01); *C03C 17/34* (2013.01); *C03C 17/3447* (2013.01); *G02B 5/3058* (2013.01)

(58) Field of Classification Search
  CPC .. C03B 23/037; C03B 2203/30; C03C 15/00; C03C 17/002; C03C 17/22; C03C 17/34; C03C 17/3421; C03C 17/3423; C03C 2218/153–2218/156; G02B 1/10; G02B 1/105; G02B 1/118; G02B 1/14

See application file for complete search history.

(56) References Cited

U.S. PATENT DOCUMENTS

| | | | |
|---|---|---|---|
| 4,304,584 A | 12/1981 | Borrelli et al. | |
| 5,886,820 A | 3/1999 | Tajima et al. | |
| 8,063,999 B2 | 11/2011 | Jabri et al. | |
| 2010/0134705 A1* | 6/2010 | Jabri et al. | ............ 349/8 |
| 2010/0231830 A1* | 9/2010 | Hirakata et al. | ............ 349/85 |
| 2012/0234046 A1* | 9/2012 | Kumai | ........ C23C 14/0057 65/32.4 |
| 2012/0237674 A1* | 9/2012 | Kumai | ........ G02B 5/3058 427/163.1 |

FOREIGN PATENT DOCUMENTS

| | | |
|---|---|---|
| JP | A-56-169140 | 12/1981 |
| JP | A-10-274711 | 10/1998 |
| JP | B2-3705505 | 10/2005 |
| WO | WO 2008/129763 A1 | 10/2008 |

* cited by examiner

*Primary Examiner* — Matthew Daniels
*Assistant Examiner* — Cynthia Szewczyk
(74) *Attorney, Agent, or Firm* — Oliff PLC

(57) ABSTRACT

A method for producing a polarizing element includes: forming particulate materials containing a metal halide on a glass substrate; forming a protective film that covers the particulate materials in a plasma environment while reducing the metal halide constituting the particulate materials; and stretching the particulate materials by stretching the glass substrate and the protective film at a temperature at which the glass substrate is softened.

4 Claims, 4 Drawing Sheets

(a) FILM FORMATION (S11)

(b) ETCHING (HALOGENATION) (S12)

(c) PROTECTIVE FILM FORMATION (S13)

(d) STRETCHING (S14)

(a) FILM FORMATION (S11)

(b) ETCHING (HALOGENATION) (S12)

(c) PROTECTIVE FILM FORMATION (S13)

(d) STRETCHING (S14)

(a) FILM FORMATION (S21)

(b) ETCHING (HALOGENATION) (S22)

(c) STRETCHING (S23)

(d) PROTECTIVE FILM FORMATION (REDUCTION OF METAL HALIDE) (S24)

METHOD FOR PRODUCING POLARIZING ELEMENT

BACKGROUND

1. Technical Field

The present invention relates to a method for producing a polarizing element.

2. Related Art

As one type of polarizing element, a polarizing glass is known. A polarizing glass can be composed only of an inorganic substance, and therefore, as compared with a polarizing plate containing an organic substance, the deterioration thereof due to light is significantly less. Therefore, a polarizing glass has drawn attention as an effective optical device in a liquid crystal projector whose brightness has been enhanced recently.

As a general polarizing glass, those described in JP-A-56-169140 are known, and a method for producing such a polarizing glass is as follows.

(1) A glass product having a desired shape is produced from a composition containing silver and at least one halide selected from the group consisting of chlorides, bromides, and iodides.

(2) The produced glass product is heated to a temperature which is higher than the strain point but not higher than the softening point of the glass by about 50° C. for a period of time sufficient to produce crystals of AgCl, AgBr, or AgI in the glass product, whereby a crystal-containing product is produced.

(3) The resulting crystal-containing product is stretched under stress at a temperature which is higher than the annealing point but lower than a temperature at which the glass has a viscosity of about 108 poises so that the crystals are stretched to have an aspect ratio of at least 5:1.

(4) The stretched product is exposed to a reducing atmosphere at a temperature which is higher than about 250° C. but not higher than the annealing point of the glass by about 25° C. for a period of time sufficient to develop a chemically reduced surface layer on the product. By this process, at least a portion of the stretched silver halide particles are reduced to elemental silver.

Further, as another polarizing element, as described in JP-A-10-274711, there is known a polarizing element in which a metal particle layer composed of metal particles with shape anisotropy and a dielectric layer composed of the same glass as a substrate are alternately laminated.

According to the production method described in JP-A-56-169140, the halide deposits uniformly in the glass product, however, in the reducing step, only the halide in the surface layer of the glass product can be reduced, and therefore, the halide remains in a central portion in the thickness direction of the glass product. Due to this, the transmittance of the polarizing element is decreased.

On the other hand, according to the polarizing element described in JP-A-10-274711, it is necessary to perform heating at a high temperature of around 500° C. for transforming a sputtered film into particles by aggregating the film through heating, and therefore, such a technique has a problem that the load in the production process is high.

SUMMARY

An advantage of some aspects of the invention is to provide a method for simply producing a polarizing element having excellent optical properties.

An aspect of the invention is directed to a method for producing a polarizing element including: forming particulate materials containing a metal halide on a glass substrate; forming a protective film that covers the particulate materials in a plasma environment while reducing the metal halide constituting the particulate materials; and stretching the particulate materials by stretching the glass substrate and the protective film at a temperature at which the glass substrate is softened.

According to this production method, in the formation of the protective film, the particulate materials of the metal halide formed on the glass substrate are exposed to plasma. Therefore, the metal halide is reduced to a metal by the action of plasma, whereby particulate materials of a metal are formed on the glass substrate. Thereafter, by stretching the particulate materials along with the glass substrate, a polarizing element can be obtained. Accordingly, it is not necessary to perform a reduction treatment of the particulate materials after stretching, and therefore, the production process can be simplified. Further, since the particulate materials are reduced by plasma, it is not necessary to perform heating at a high temperature for reduction, and therefore, the load in the production process can be reduced.

Another aspect of the invention is directed to a method for producing a polarizing element including: forming particulate materials containing a metal halide on a glass substrate; stretching the particulate materials by stretching the glass substrate at a temperature at which the glass substrate is softened; and forming a protective film that covers the stretched particulate materials in a plasma environment while reducing the metal halide constituting the stretched particulate materials.

In this production method, the particulate materials of the metal halide are stretched, and therefore, the method has an advantage that acicular particles having a high aspect ratio can be easily formed. Further, also in the case of this production method, the particulate materials can be reduced in the process of forming the protective film. Accordingly, it is not necessary to perform a reduction treatment of the particulate materials after stretching, and therefore, the production process can be simplified. Further, since the particulate materials are reduced by plasma, at is not necessary to perform heating at a high temperature for reduction, and therefore, the load in the production process can be reduced.

The production method may be configured such that the protective film is formed by a sputtering method, an ion plating method, or a plasma CVD method.

By adopting such a film forming method, the reduction treatment of the particulate materials can be performed while forming the protective film.

The production method may be configured such that in the formation of the protective film, a process gas including a reducing gas is used.

According to this production method, the particulate materials can be more reliably reduced to a metal.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings.

Incidentally, the scope of the invention is not limited to the following embodiments, and can be arbitrarily changed within the scope of the technical idea of the invention. Further, in the following drawings, in order to make each structure easily understandable, the scale, the number, or the like in each structure is made different from that in the actual structure in some cases.

First Embodiment

FIGS. 1A to 1D are views showing a method for producing a polarizing element according to this embodiment. FIGS. 2A and 2B are explanatory views showing a planar structure of a substrate in a production step according to this embodiment.

As shown in FIGS. 1A to 1D, the method for producing a polarizing element according to this embodiment includes a film forming step S11, an etching step S12, a protective film forming step S13, and a stretching step S14.

Figure 1:
FIGS. 1A to 1D are views showing a method for producing a polarizing element according to a first embodiment.
Figure 1:
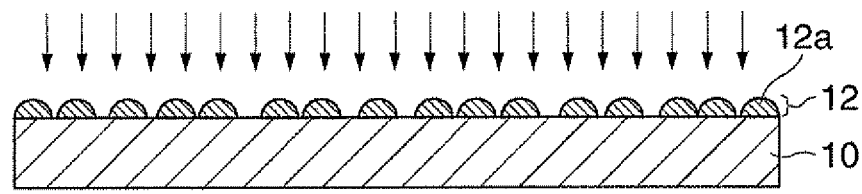
Figure 1:
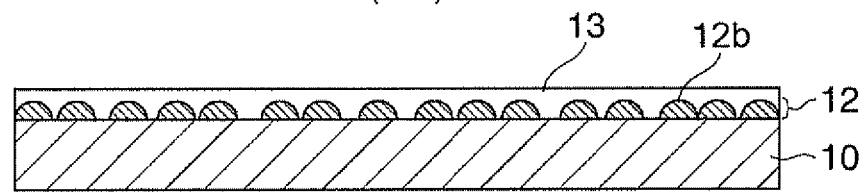
Figure 1:
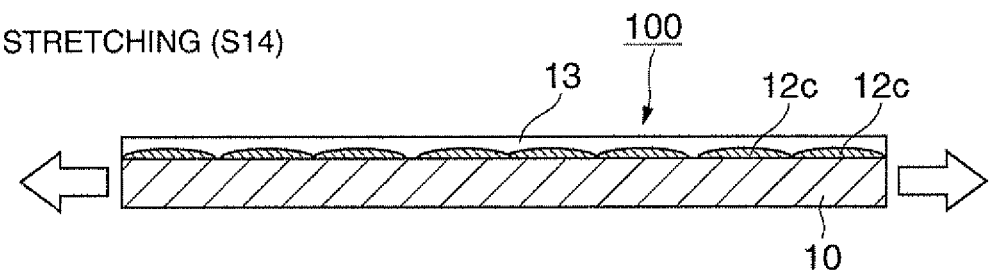
Figure 2A:
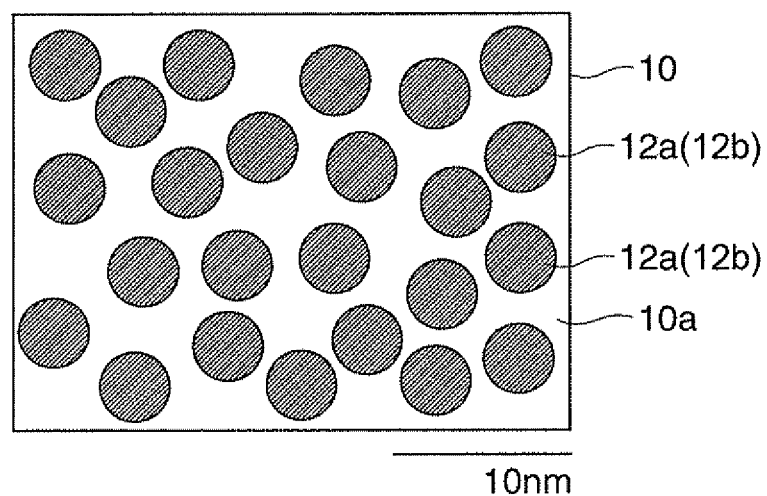
FIGS. 2A and 2B are explanatory views showing a planar structure of a substrate in a production step according to the first embodiment.
Figure 2B:
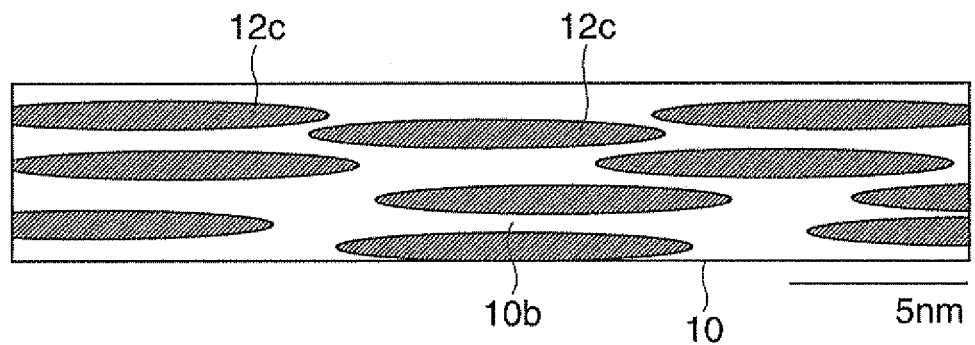

As shown in FIG. 1A, the film forming step S11 is a step of forming a coating film 11 of a metal on a glass substrate 10.

The glass substrate 10 is not particularly limited, and any known glass substrate can be used. This is because in the method for producing a polarizing element according to this embodiment, it is not necessary to deposit a metal halide in the glass substrate or introduce a metal ion into the surface of the glass substrate by ion exchange, and therefore, the glass substrate may be any as long as the coating film 11 of a metal halide can be formed thereon. Specifically, any of various glass substrates such as quartz glass, soda lime glass, sapphire glass, borosilicate glass, and aluminoborosilicate glass can be used according to the intended use of the polarizing element.

A film forming method for the coating film 11 is not particularly limited as long as it is a method capable of forming a metal thin film having a desired thickness, and either of a gas-phase method and a liquid-phase method may be used. In the case of using a gas-phase method, either of a physical vapor deposition method and a chemical vapor deposition method may be used. Since a film forming species is a metal and the thickness of the formed film is about several nanometers to several tens nanometers, it is convenient to use a sputtering-based physical vapor deposition method. Examples of the sputtering-based physical vapor deposition method include magnetron sputtering, ion beam sputtering, and ECR sputtering.

It is a matter of course that in place of the above-described sputtering-based physical vapor deposition method, an evaporation-based physical vapor deposition method such as a vacuum vapor deposition method, a molecular beam vapor deposition method (MBE), an ion plating method, or an ion beam vapor deposition method can be used.

In the film forming step S11, for example, in the case of using a sputtering method, the coating film 11 can be formed using a target composed of one or more metals selected from Au, Ag, Cu, Cd, and Al as a metal target and also using a typical process gas such as Ar.

Subsequently, in the etching step S12, a treatment in which the coating film 11 is exposed to plasma of a gas containing a halogen or a halogen compound is performed. By doing this, a process of forming an island-shaped film 12 composed of a large number of island-shaped particles 12a by etching the coating film 11 formed in the film forming step S11 and a process of halogenating the metal constituting the coating film 11 (island-shaped film 12) are performed at the same time. According to the etching step S12, the island-shaped film 12, which is an assembly of the island-shaped particles (particulate materials) 12a containing a metal halide is formed on the glass substrate 10.

As the process gas to be used in the plasma treatment, a halogen gas ($F_2$, $Cl_2$, $Br_2$, or $I_2$) or a halogen compound gas can be used alone or along with an inert gas such as Ar. The halogen compound is not particularly limited, however, examples thereof include boron compounds such as $BCl_3$, $BBr_3$, and $BF_3$; fluorocarbon compounds such as $CF_4$ and $C_2F_6$; germanium compounds such as $GeCl_4$ and $GeF_4$; silicon compounds such as $SiCl_4$ and $SiF_4$; silane compounds such as $SiHCl_3$ and $SiH_2Cl_2$; $NF_3$, $PF_3$, $SF_6$, $SnCl_4$, $TiCl_4$, and $WF_6$.

By the plasma treatment, a halogen radical in the plasma is reacted with the metal constituting the coating film 11, so that the coating film 11 is converted into a film composed of a metal halide. The formed metal halide is, for example, $AgClx$, $AlF$, $AgF$, $AgBr$, $AgI$, $AlClx$, or the like.

Further, in the plasma treatment, ion sputtering occurs simultaneously with the above-described halogenation reaction, and therefore, the coating film 11 is gradually etched. By partially removing the coating film 11 by utilizing this action, the island-shaped film 12 in which a large number of the island-shaped particles 12a are arranged in a plane is formed.

FIG. 2A is a plan view showing the surface of the glass substrate after the etching step. As shown in FIG. 2A, by the above-described etching treatment, the island-shaped particles (particulate materials) 12a composed of a metal halide (such as $AgClx$ or $AlF$) having a particle diameter of about 2 to 8 nm are formed on the glass substrate 10. In a region among the island-shaped particles 12a, a region 10a in which the surface of the glass substrate 10 is exposed is formed.

In the etching step S12 according to this embodiment, it is necessary to allow the coating film 11 to remain in the form of islands while halogenating the coating film 11, and therefore, it is not preferred that the formed metal halide is excessively etched. Therefore, it is preferred that by setting a substrate bias lower than that in the case of performing common reactive dry etching or by applying no substrate bias, the acceleration of ions incident to the glass substrate 10 is slowed and also the ratio of ions incident perpendicularly to the glass substrate 10 is suppressed to low. The etching rate in the etching step S12 is preferably set in a range of 5 nm/min to 100 nm/min although it depends on the thickness of the coating film 11.

Incidentally, in the etching step S12 according to this embodiment, the halogenation of the metal constituting the coating film 11 and the formation of the island-shaped particles 12a by etching are performed simultaneously, however, these processes may be performed in separate steps. That is, the etching step may include a coating film processing step in which the coating film 11 is partially removed and formed into the shape of islands and a halogenating step in which the metal constituting the coating film 11 is halogenated. The order of the coating film processing step and the halogenating step may be reversed.

In the coating film processing step, it is preferred to use a dry etching treatment. As the dry etching treatment, a sputter etching treatment using an inert gas (such as Ar) is simple, and therefore is preferred.

Further, in some cases, for the purpose of only processing the coating film 11, a reactive dry etching treatment using a reactive gas (such as $Cl_2$, $BCl_3$, HBr, $CF_4$, or $SF_6$) may be performed. In the reactive dry etching treatment in this case, it is not necessary to halogenate the metal constituting the coating film 11, and therefore, processing can be performed under a condition in which all of the island-shaped particles 12a are not halogenated, or the type of the reactive gas can be selected by giving priority to the processing properties.

In the halogenating step, a method in which the metal is halogenated by exposing the glass substrate 10 to a gas containing a halogen or a halogen compound to bring the coating film 11 into contact with the gas can be used. For example, a method in which halogenation is allowed to proceed from the surface of the coating film 11 by heating the glass substrate 10 in an atmosphere containing $Cl_2$ gas or $Br_2$ gas can be used.

Incidentally, a plasma treatment using a process gas containing a halogen may be performed for the purpose of only effecting halogenation. In this case, it is not necessary to consider the processability of the coating film 11, and therefore, the process gas can be selected by giving priority to the physical properties of a metal halide to be produced or the halogenation efficiency.

Subsequently, in the protective film forming step S13, as shown in FIG. 1C, a protective film 13 is formed such that the protective film 13 covers the island-shaped film 12.

A material of the protective film 13 is not particularly limited as long as the material can form a transparent coating film and can withstand the heating temperature in the subsequent stretching step S14. For example, silicon oxide, silicon nitride, titanium oxide, zirconium oxide, or the like can be used. In this embodiment, since a glass substrate is used as the base material, it is preferred to use silicon oxide, which is a common component in both members.

In the protective film forming step S13 according to this embodiment, as a method for forming the protective film 13, a film forming method in which the island-shaped film 12 is exposed to plasma (a plasma film forming method) is adopted. As the plasma film forming method, either of a physical vapor deposition method and a chemical vapor deposition method may be used. Examples of the physical vapor deposition method include a sputtering method and an ion plating method. It is also possible to use a method other than the above-described methods as long as it is a vapor deposition method capable of exposing the island-shaped film 12 to plasma. Further, as the chemical vapor deposition method, plasma CVD can be used.

In the production method according to this embodiment, in the protective film forming step S13 shown in FIG. 1C, by forming the protective film 13 while exposing the island-shaped film 12 to plasma, the formation of the protective film 13 and the reduction treatment of the metal halide constituting the island-shaped particles 12a are performed at the same time.

Figure 3:
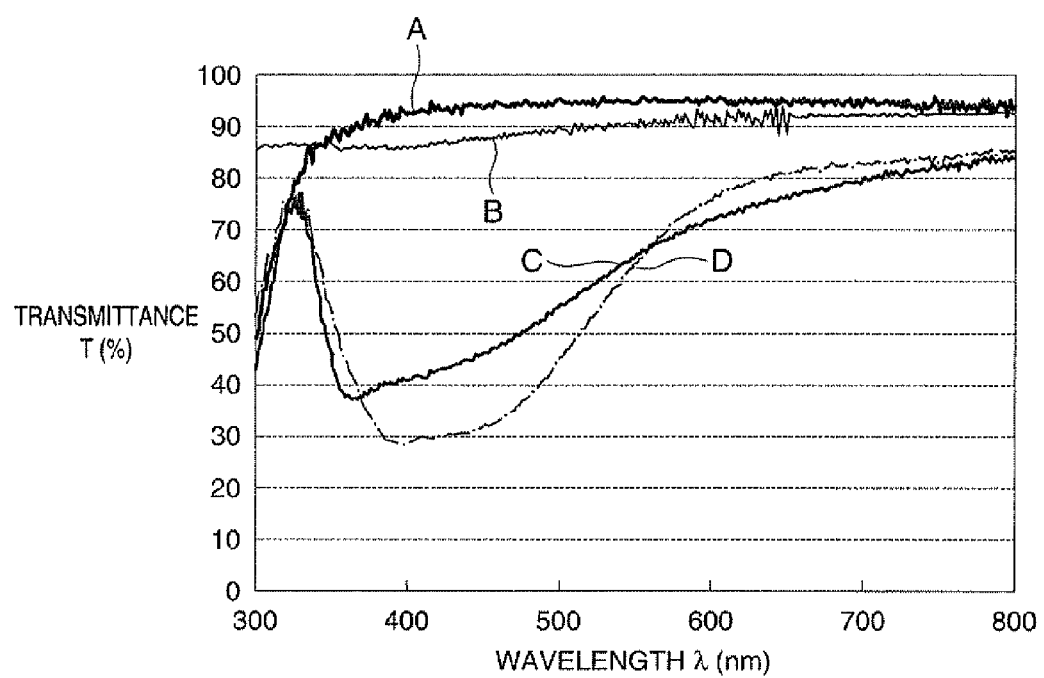
FIG. 3 is a graph showing transmittances of films produced by a plurality of production methods.

FIG. 3 is a graph showing transmittances of films produced by various production methods.

In FIG. 3, the transmittances of the following films [A] to [D] in a wavelength range of 300 nm to 800 nm are shown.

An AgClx film [A] is an AgClx film formed by a reactive sputtering method.

A heat-treated AgClx film [B] is a film obtained by heating the AgClx film [A] at 400° C. in an air atmosphere for 4 hours.

A plasma-treated AgClx film [C] is a film obtained by subjecting the AgClx film [A] to reverse sputtering using Ar plasma for 15 seconds.

A laminate film [D] is a film obtained by forming a $SiO_2$ film on the AgClx film [A] using a sputtering method.

The AgClx film [A] showed a transmittance exceeding 90% in a wavelength range of 350 nm to 800 nm, and was a film substantially transparent in the visible light range. Further, although the transmittance of the heat-treated AgClx film [B] was somewhat low on the lower wavelength side, the heat-treated AgClx film [B] showed a transmittance as high as 85% or more in a wavelength range of 300 nm to 800 nm.

On the other hand, the transmittance of the plasma-treated AgClx film [C] was lower on the whole than that of the AgClx film [A], and particularly, the transmittance of the plasma-treated AgClx film [C] was lower than 50% in a wavelength range of 350 nm to 480 nm. Further, in the case of the laminate film [D], the transmittance thereof in a wavelength range of 400 nm to 450 nm was significantly decreased as compared with that of the plasma-treated AgClx film [C].

Then, an X-ray diffraction (XRD) measurement was performed for the plasma-treated AgClx film [C] and the laminate film [D]. As a result, metal Ag was detected in both samples. Further, with respect to the plasma-treated AgClx film [C] and the laminate film [D], the wavelength range in which the transmittance was decreased includes the wavelength (around 400 nm) of plasmon absorption of metal Ag.

From the above results, it was found that by exposing the AgClx film formed on the glass substrate to plasma, AgClx is reduced to produce metal Ag.

In the production method according to this embodiment, in the same manner as the plasma-treated AgClx film [C] shown in FIG. 3, the protective film forming step S13 is performed by a plasma film forming method. By doing this, the island-shaped particles 12a are exposed to plasma, and the metal halide constituting the island-shaped particles 12a is reduced. As a result, as shown in FIG. 1C, island-shaped metal particles 12b composed of a metal obtained by reducing the metal halide are formed on the glass substrate 10.

For example, in the case where the island-shaped particles 12a are composed of AgClx, island-shaped metal particles 12b composed of Ag are formed. In the case where the island-shaped particles 12a are composed of AlF, island-shaped metal particles 12b composed of Al are formed.

The thickness of the protective film 13 is not particularly limited, however, for example, in the case where the protective film 13 is formed of a silicon oxide film, the thickness thereof is in a range of 100 nm to 500 nm. If the protective film 13 is too thin, the protective film 13 may be ruptured to expose the island-shaped particles 12a in the subsequent stretching step S14. On the other hand, as the thickness of the protective film 13 is increased, the film formation time is prolonged to increase the film formation cost, and therefore, it is not necessary to excessively increase the film thickness as long as the protection performance is obtained.

Subsequently, in the stretching step S14, as shown in FIG. 1D, the glass substrate 10 is stretched in a direction parallel to the plane of the glass substrate 10 on which the island-shaped metal particles 12b are formed at a temperature at which the glass substrate 10 is softened. As a stretching method, a stretching treatment in which the glass substrate 10 is stretched in a direction parallel to the plane of the glass substrate 10 or a rolling treatment in which the glass substrate 10 is rolled thin by pressure can be used.

The heating temperature in the stretching step S14 is set according to the material of the glass substrate 10 or the island-shaped metal particles 12b. In this embodiment, the heating temperature is set to a temperature at which the glass substrate 10 can be softened without melting and the island-shaped metal particles 12b composed of a metal can be stretched.

By the stretching step S14, the glass substrate 10 is stretched in the stretching direction and processed thin. In addition, the island-shaped metal particles 12b on the glass substrate 10 are also stretched in the stretching direction, and, as shown in FIG. 2B, formed into a large number of acicular metal particles 12c oriented in the stretching direction (in the horizontal direction in FIG. 2B) on the glass substrate 10. The acicular metal particles 12c have an elongated shape with an aspect ratio of 1.5 or more, and for example, have a width of about 1 to 3 nm and a length of about 1.5 to 10 nm. Further, as shown in FIG. 1D, the protective film 13 that covers the island-shaped metal particles 12b is also stretched thin along with the glass substrate 10 and formed into a protective film that covers the acicular metal particles 12c.

In a region among a plurality of the acicular metal particles 12c formed by the stretching step S14, an elongated slit-shaped region 10b is formed by stretching the region 10a shown in FIG. 2A. As for the size of the slit-shaped region 10b, although it varies depending on the density of the formed island-shaped particles 12a, the width thereof is from about 1 to 5 nm and the length thereof is from about 3 to 20 nm.

According to the above-described steps, a polarizing element 100 in which a large number of acicular metal particles 12c which are oriented in the same direction in a plane of the glass substrate 10 are arranged with the slit-shaped region 10b (see FIG. 2B) interposed thereamong on the glass substrate 10 can be produced.

The polarizing element 100 produced by the production method according to this embodiment can be used as an optical element which has a function of separating transmitted light into linearly polarized light in a predetermined vibrating direction since the acicular metal particles 12c having a width less than that of the wavelength of visible light are arranged at a narrow pitch.

Further, in the polarizing glass of the related art, the arrangement density of the acicular metal particles was about 20 particles or less per cubic micrometer, and therefore, in order to obtain high polarization separation performance, it was necessary to distribute the acicular metal particles widely in a thickness direction of the glass substrate. On the other hand, in the polarizing element according to this embodiment, the acicular metal particles 12c are arranged at a high density on the surface of the glass substrate 10, and therefore, the glass substrate 10 having an arbitrary thickness can be used, and it is also easy to produce a thin polarizing element.

According to the production method of this embodiment described in detail above, the island-shaped particles 12a containing a metal halide are formed on the surface of the glass substrate 10 using a thin-film forming technique, and then, the metal halide is reduced before stretching the island-shaped particles 12a. Therefore, the metal halide can be reliably reduced, and the acicular metal particles 12c composed only of a metal can be easily and reliably obtained. Accordingly, unlike the polarizing glass of the related art, the light transmittance is not decreased by a residual metal halide in the glass substrate.

Further, in the production method according to this embodiment, the protective film 13 is formed by a plasma film forming method in the protective film forming step S13. Accordingly, the formation of the protective film 13 and the reduction of the metal halide by exposure to plasma can be performed at substantially the same time. As a result, it is not necessary to perform a reduction treatment after the stretching step S14, and therefore, the production process can be simplified. Further, it is also not necessary to perform heating at a high temperature for reduction, and therefore, the load in the production process can be reduced.

Further, in the protective film forming step S13, the process gas for forming the protective film 13 is mixed with a reducing gas such as hydrogen and the resulting mixed gas may be used. By doing this, the reduction reaction of the island-shaped particles 12a can be accelerated, and therefore, it becomes possible to more reliably reduce the island-shaped particles 12a to metal.

In the production method according to this embodiment, the island-shaped metal particles 12b composed of a metal are stretched in the stretching step S14. For example, in the case where the island-shaped particles 12a are composed of AgClx (melting point: 450° C.), the melting point of metal Ag constituting the island-shaped metal particles 12b after reduction is 950° C. Therefore, in the stretching step S14 according to this embodiment, the stretching is performed by heating the glass substrate 10 to a higher temperature and by applying a higher stress thereto as compared with the case where the island-shaped particles 12a composed of a metal halide are stretched.

As described above, in the stretching step S14, the island-shaped metal particles 12b, which are less easily stretched as compared with a metal halide, are stretched, and therefore, it might be difficult to obtain the acicular metal particles 12c having a large aspect ratio by the production method according to this embodiment. On the other hand, in the stretching step S14, the island-shaped metal particles 12b are difficult to melt, and therefore, it is less likely to cause the molten island-shaped metal particles 12b to flow and move to an unintended position or have an irregular shape. Therefore, according to the production method of this embodiment, the acicular metal particles 12c having uniform dimensions and shape can be obtained. As a result, the polarizing element 100 obtained by the production method according to this embodiment has a high light absorptivity at a specific wavelength.

Further, in this embodiment, a thin-film forming technique such as sputtering or dry etching is used for forming the island-shaped particles 12a, and therefore, there is no need for a production step in which a glass substrate is immersed in a molten salt at a high temperature for a long period of time, for example, a process of introducing a metal element into a surface layer portion of a glass substrate by ion exchange. Accordingly, the energy consumption in the production can be extremely reduced and an environmental load can be reduced. Further, the production method according to this embodiment is excellent in productivity as compared with the production method of the related art.

Further, according to the production method of this embodiment, the island-shaped film 12 is formed by partially removing the coating film 11 in the etching step S12, and therefore, the arrangement density of the island-shaped particles 12a can be extremely easily controlled. That is, the optical properties of the polarizing element can be extremely easily controlled.

Further, according to the production method of this embodiment, the island-shaped particles 12a composed of a metal halide are formed using a thin-film forming technique, and therefore, it is extremely easy to change the material of the metal halide to be formed to another material. Accordingly, even a material which could not be used in the process for producing a polarizing glass of the related art can be used. Since the range of selection of the materials is widened in this manner, it becomes easy to control the optical properties of the polarizing element and also it becomes easy to increase the productivity.

Second Embodiment

FIGS. 4A to 4D are views showing a method for producing a polarizing element according to this embodiment.

As shown in FIGS. 4A to 4D, the method for producing a polarizing element according to this embodiment includes a film forming step S21, an etching step S22, a stretching step S23, and a protective film forming step S24.

In the above-described first embodiment, in the protective film forming step S13, the island-shaped particles 12a are reduced, and the island-shaped metal particles 12b after reduction are stretched, thereby forming the acicular metal particles 12c. On the other hand, the production method according to this embodiment is a method for producing a polarizing element, wherein prior to the protective film forming step S24, the island-shaped particles 12a are stretched, and then, a reduction treatment of a metal halide constituting stretched acicular particles is performed.

Figure 4:
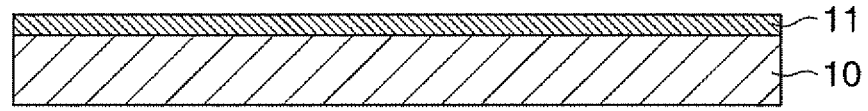
FIGS. 4A to 4D are views showing a method for producing a polarizing element according to a second embodiment.
Figure 4:
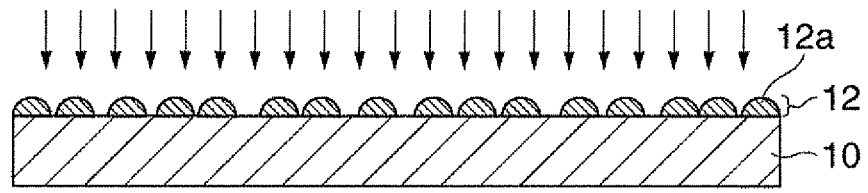
Figure 4:
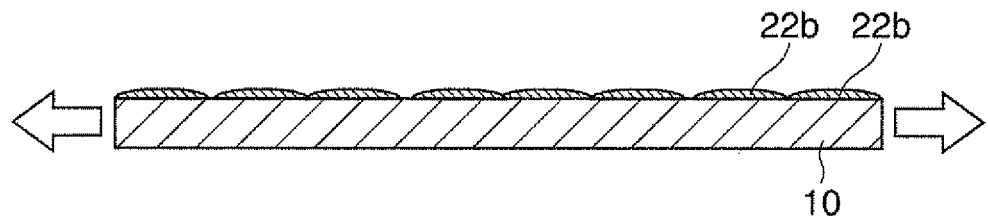
Figure 4:
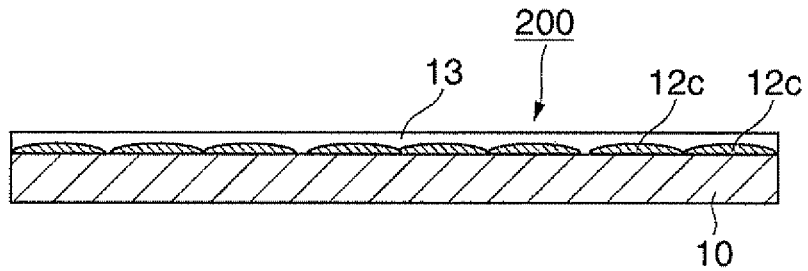

The film forming step S21 and the etching step S22 are the same as the film forming step S11 and the etching step S12 in the first embodiment, respectively. As shown in FIG. 4B, by the film forming step S21 and the etching step S22, an island-shaped film 12 composed of island-shaped particles 12a of a metal halide is formed on a glass substrate 10.

Subsequently, in the stretching step S23, as shown in FIG. 4C, the glass substrate 10 is stretched in a direction parallel to the plane of the glass substrate 10 on which the island-shaped particles 12a are formed at a temperature at which the glass substrate 10 is softened. The heating temperature in the stretching step S23 is not particularly limited, and the glass substrate 10 may be heated to a temperature at which the glass substrate 10 can be softened without melting.

By the stretching step S23, the glass substrate 10 is stretched in the stretching direction and processed thin. In addition, the island-shaped particles 12a on the glass substrate 10 are also stretched in the stretching direction. By doing this, acicular particles 22b having the same shape as the acicular metal particles 12c shown in FIG. 2B are formed on the glass substrate 10. The acicular particles 22b are particles in the acicular form, which contain a metal halide and are oriented in the stretching direction (in the horizontal direction in FIG. 4C) on the glass substrate 10.

The acicular particles 22b have an elongated shape with an aspect ratio of 5 or more, and for example, have a width of about 1 to 3 nm and a length of about 5 to 20 nm. Further, in a region among a plurality of the acicular particles 22b, an elongated slit-shaped region in which the surface of the glass substrate 10 is exposed is formed. As for the size of the slit-shaped region, although it varies depending on the density of the formed island-shaped particles 12a, the width thereof is from about 1 to 10 nm and the length thereof is from about 3 to 50 nm.

Subsequently, in the protective film forming step S24, as shown in FIG. 4D, a protective film 13 is formed such that the protective film 13 covers the acicular particles 22b.

As a material of the protective film 13, silicon oxide, silicon nitride, titanium oxide, zirconium oxide, or the like can be used in the same manner as the above-described first embodiment.

Also in the protective film forming step S24 according to this embodiment, as a method for forming the protective film 13, a film forming method using plasma (a plasma film forming method) is adopted. As the plasma film forming method, either of a physical vapor deposition method and a chemical vapor deposition method may be used.

Further, in the protective film forming step S24, the acicular particles 22b composed of a metal halide are exposed to plasma, whereby the metal halide constituting the acicular particles 22b is reduced to a metal. In this manner, acicular metal particles 12c composed of a metal are formed on the glass substrate 10, and at the same time, the protective film 13 that covers the acicular metal particles 12c is formed.

According to the above-described steps, a polarizing element 200 of this embodiment can be produced.

In the production method according to this embodiment described above, prior to the reduction of the metal halide in the protective film forming step S24, the stretching step S23 is performed. Therefore, the island-shaped particles 12a can be stretched more easily as compared with the case where particulate materials composed of a metal are stretched. For example, in the case where the island-shaped film 12 is composed of AgClx, the melting point thereof is about 450° C. Therefore, by heating the glass substrate 10 to 600° C. to 700° C. in the stretching step S23, the island-shaped particles 12a can be easily stretched along with the glass substrate 10.

Further, also in this embodiment, it is not necessary to provide a separate reducing step, and therefore, the production process can be simplified. Further, it is not necessary to perform heating at a high temperature for reduction, and therefore, the load in the production process can be reduced.

Incidentally, since the island-shaped particles 12a are stretched in a state where the protective film 13 is not formed in this embodiment, there is a possibility that if the heating temperature is too high, the island-shaped particles 12a are completely melted to flow and are aggregated into coarse particles. Therefore, the island-shaped particles 12a may be formed using a metal halide having a relatively high melting point so that the island-shaped particles 12a are not completely melted at the softening temperature of the glass substrate 10.

Third Embodiment

In the above-described first embodiment, after the coating film 11 of a metal is formed on the glass substrate 10, the metal constituting the coating film 11 is halogenated. However, it is also possible to form the island-shaped film 12 by forming the coating film 11 composed of a metal halide in the film forming step S11, and then partially removing the coating film 11 in the following etching step.

A modification of the production step according to this embodiment can be applied also to the second embodiment without any problem. Therefore, in the following description, the film forming step 811 can be replaced with the film forming step S21, and the etching step S12 can be replaced with the etching step S22.

In this embodiment, the film forming step S11 is a step in which a coating film 11 composed of a metal halide is formed on a glass substrate 10 using a reactive physical vapor deposition method.

The reactive physical vapor deposition method is a film forming method in which a thin film of a compound is formed by a reaction during physical vapor deposition. In the case of this embodiment, by a reaction between metal particles scattered by a physical vapor deposition method and a halogen contained in a reaction gas, the coating film 11 composed of a metal halide is formed on the glass substrate 10.

In the film forming step S11, for example, in the case of using reactive sputtering, a target composed of one or more metals selected from Au, Ag, Cu, Cd, and Al can be used as a metal target. As the reaction gas, a halogen (F, Cl, Br, I, At, or Uus) gas or a halogen compound gas is used. Examples of the metal halide to be formed using these include AgClx, AlF, AgF, AgBr, AgI, and AlClx.

The halogen compound gas is not particularly limited, however, examples thereof include boron compound gases such as $BCl_3$, $BBr_3$, and $BF_3$; fluorocarbon compound gases such as $CF_4$ and $C_2F_6$; germanium compound gases such as $GeCl_4$ and $GeF_4$; silicon compound gases such as $SiCl_4$ and $SiF_4$; silane compound gases such as $SiHCl_3$ and $SiH_2Cl_2$; $NF_3$, $PF_3$, $SF_6$, $SnCl_4$, $TiCl_4$, and $WF_6$.

Subsequently, in the etching step S12 of this embodiment, by subjecting the coating film 11 formed in the film forming step S11 to an etching treatment, an island-shaped film 12 composed of a large number of island-shaped particles 12a is formed.

As the etching treatment, a dry etching treatment is preferably used. However, as previously described with reference to FIG. 3, when a sputter etching treatment using an inert gas such as Ar is performed, the metal halide constituting the coating film 11 may be reduced in some case.

In order to avoid unintended reduction of the metal halide, dry etching may be performed using an etching gas containing a halogen (such as Cl, Br, or F) contained in the metal halide constituting the coating film 11. That is, a reactive dry etching treatment using a reactive gas (such as $Cl_2$, $BCl_3$, $HBr$, $CF_4$, or $SF_6$) or a sputter etching treatment using a mixed gas of such a reactive gas with an inert gas (such as Ar) may be performed.

In this embodiment, the coating film 11 having a uniform film thickness and uniform film properties is formed in the film forming step S11, and then, the coating film 11 is processed into the island-shaped film 12 in the following etching step S12. However, in the case where the island-shaped film 12 can be formed in the film forming step S11, the etching step S12 is not needed.

In the film forming step S11 of this embodiment, a film of a metal halide is formed using a reactive physical vapor deposition method. However, a metal halide can easily evaporate, and therefore, by adjusting the balance between deposition of the metal halide formed by the reaction on the glass substrate 10 and evaporation of the metal halide from the glass substrate 10, the island-shaped film 12 as shown in FIG. 2A can be formed by the film forming step S11. Further, by adjusting the film forming conditions, a ratio between the island-shaped particles 12a and the region 10a can be adjusted, and therefore, it is also possible to adjust the optical properties.

The entire disclosure of Japanese Patent Application No. 2012-048257, filed on Mar. 5, 2012 is expressly incorporated by reference herein.

What is claimed is:

1. A method for producing a polarizing element, comprising:
    forming particulate materials containing a metal halide on a glass substrate;
    forming a protective film that covers the particulate materials in a plasma environment while reducing the metal halide constituting the particulate materials; and
    stretching the particulate materials by stretching the glass substrate and the protective film at a temperature at which the glass substrate is softened,
    wherein the articulate materials are disposed between the glass substrate and the protective film.

2. The method for producing a polarizing element according to claim 1, wherein the protective film is formed by a sputtering method, an ion plating method, or a plasma CVD method.

3. The method for producing a polarizing element according to claim 1, wherein the protective film is formed using a process gas including a reducing gas.

4. A method for producing a polarizing element, comprising:
    forming particulate materials containing a metal halide on a glass substrate;
    stretching the particulate materials by stretching the glass substrate at a temperature at which the glass substrate is softened; and
    forming a protective film that covers the stretched particulate materials in a plasma environment while reducing the metal halide constituting the stretched particulate materials,
    wherein the particulate materials are disposed between the glass substrate and the protective film.

\* \* \* \* \*